F. A. HART.
COMBINED TYPEWRITING AND COMPUTING MACHINE.
APPLICATION FILED MAY 18, 1917.

1,339,704. Patented May 11, 1920.
5 SHEETS—SHEET 1.

INVENTOR:
Frederick A. Hart
BY B. C. Stickney
ATTORNEY.

WITNESSES:
Arthur C. Johnson
John Waldheim

F. A. HART.
COMBINED TYPEWRITING AND COMPUTING MACHINE.
APPLICATION FILED MAY 18, 1917.

1,339,704. Patented May 11, 1920.
5 SHEETS—SHEET 2.

FIG. 3.

WITNESSES:
Arthur A. Johnson
John Waldheim

INVENTOR:
Frederick A. Hart
BY D. C. Stickney
ATTORNEY.

F. A. HART.
COMBINED TYPEWRITING AND COMPUTING MACHINE.
APPLICATION FILED MAY 18, 1917.

1,339,704.

Patented May 11, 1920.
5 SHEETS—SHEET 5.

WITNESSES:
Arthur A. Johnson
John Waldheim

INVENTOR:
Frederick A. Hart
BY B. C. Stickney
ATTORNEY.

UNITED STATES PATENT OFFICE.

FREDERICK A. HART, OF NEWARK, NEW JERSEY, ASSIGNOR TO UNDERWOOD COMPUTING MACHINE COMPANY, OF NEW YORK, N. Y., A CORPORATION OF NEW YORK.

COMBINED TYPEWRITING AND COMPUTING MACHINE.

1,339,704.    Specification of Letters Patent.    Patented May 11, 1920.

Application filed May 18, 1917. Serial No. 169,402.

*To all whom it may concern:*

Be it known that I, FREDERICK A. HART, a citizen of the United States, residing in Newark, in the county of Essex and State of New Jersey, have invented certain new and useful Improvements in Combined Typewriting and Computing Machines, of which the following is a specification.

This invention relates to an improvement in computing machines of the Underwood-Hanson type, and is an improvement on application of Hans Hanson No. 626,550 filed May 11, 1911, (now Patent No. 1,278,812, dated September 10, 1918,) and application of Ogden Minton No. 797,714 filed October 28, 1913 (now Patent No. 1,280,065, dated September 24, 1918). One of the objects of this invention is to insure the setting of the computing mechanism for subtraction when a subtraction zone is reached.

In the machine of the type in which this invention is applied, the computation is first indexed or set up in a nest of pins, and then all of the digits of the number thus set up are transferred to a computing head or register. Subtraction is accomplished by the complementary method. That is, the complements of the digits are set up in the nest of pins, and the computing wheels of the register are rotated these complementary amounts in the same direction as if adding, thus obtaining a subtraction action.

In a combined typewriting and computing machine of this type, the typewriter carriage determines different computing zones in which the numbers are written and in which it is desired to add or subtract. When a subtracting zone is reached, the mechanism must be shifted, so that instead of setting up numbers corresponding to the numeral keys actuated, the complementary numbers will be set up. This requires a change of the pin-setting mechanism to set the complementary pins by a subtraction setting mechanism.

To insure the operative taking care of this subtraction setting at the proper time, there is provided on the carriage a subtraction tappet which is so positioned that, when a subtraction zone is reached, it will operate, through an intermediate linkage, a locking mechanism, which is common to all the numeral keys. Thus, when a subtraction zone is reached, the numeral keys are locked, so that the operative cannot compute until this locking mechanism is released. The locking mechanism thus brought into play, is connected to be released by the subtraction-setting mechanism when it is actuated.

Sometimes it is desirable to operate the typewriting mechanism without computing, for which purpose a non-add key is provided. The non-add key is connected to silence the subtraction safeguard locking mechanism, so that when the machine is not computing, the locking of the numeral keys from the subtraction tappet will not take place.

The subtraction safeguard locking mechanism for the numeral keys may also be silenced from another source than the non-adding key, so that both adding and subtraction as well as typewriting, can take place without locking the numeral keys when entering a subtraction zone.

Other features and advantages will hereinafter appear.

In the accompanying drawings.

Numeral keys 1 and alphabet keys 2 depress key levers 3 to swing bell-cranks 4, so as to swing type-bars 5 up rearwardly against the front side of the platen 6 mounted to rotate in a carriage 7. The carriage 7 has a step-by-step movement under the control of the character keys 1 and 2, with the aid of the usual Underwood escapement mechanism, indicated at 8. The carriage 7 also may have a jump or tabulating movement under the control of tabulating keys 9, which depress key-levers 10, to swing upwardly plunger stops 11 into the path of carriage-carried stops 12. These stops may be set selectively at letter-space intervals on a rack 13 carried by the carriage 7. In addition to typewriting, numeral keys 1, of this device, also effect computing operations. For this purpose, each of the numeral keys from "1" to "9" is provided with a dependent stem 14 which is arranged to engage an arm 15 on the associated one of a series of shafts 16. Each of the shafts 16 is connected to operate a parallel linkage 17, which will set an individual of a nest of pins 18 according to the particular numeral key actuated and to the particular letter-space or digit column in which it is actuated, that is to say, a cross selection is effected. To assist the numeral keys in this selection, there is provided on the carriage 7, one or more denominational selectors 19, according to the number of computing zones desired. The denominational selectors 19 are adjustably spaced at letter-space intervals along the carriage 7 by means of a pair of rods 20, 21 either or both of which may be racks provided with teeth at letter-space intervals.

Figures 1, 2:
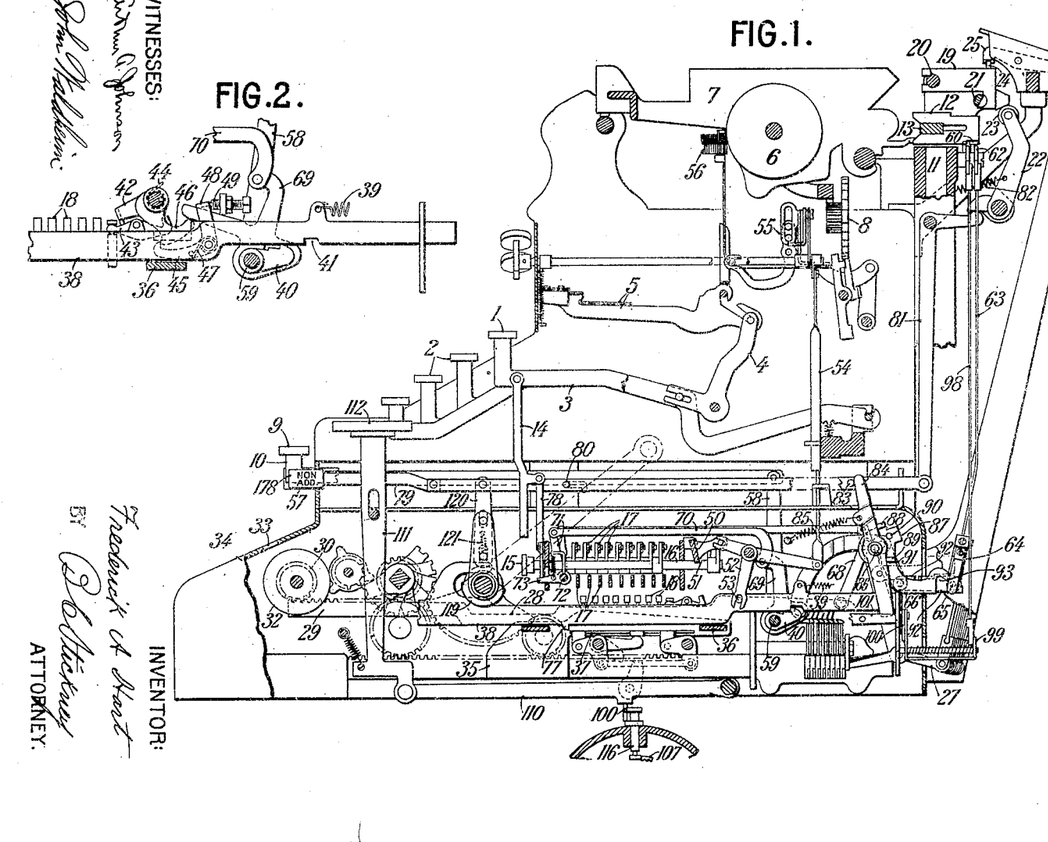
Figure 1 is a vertical section, taken from front to rear, with parts omitted to simplify the showing.
Fig. 2 is a detail view of the "9" pin-setting mechanism used in effecting a complementary subtraction.
Figures 8, 9:
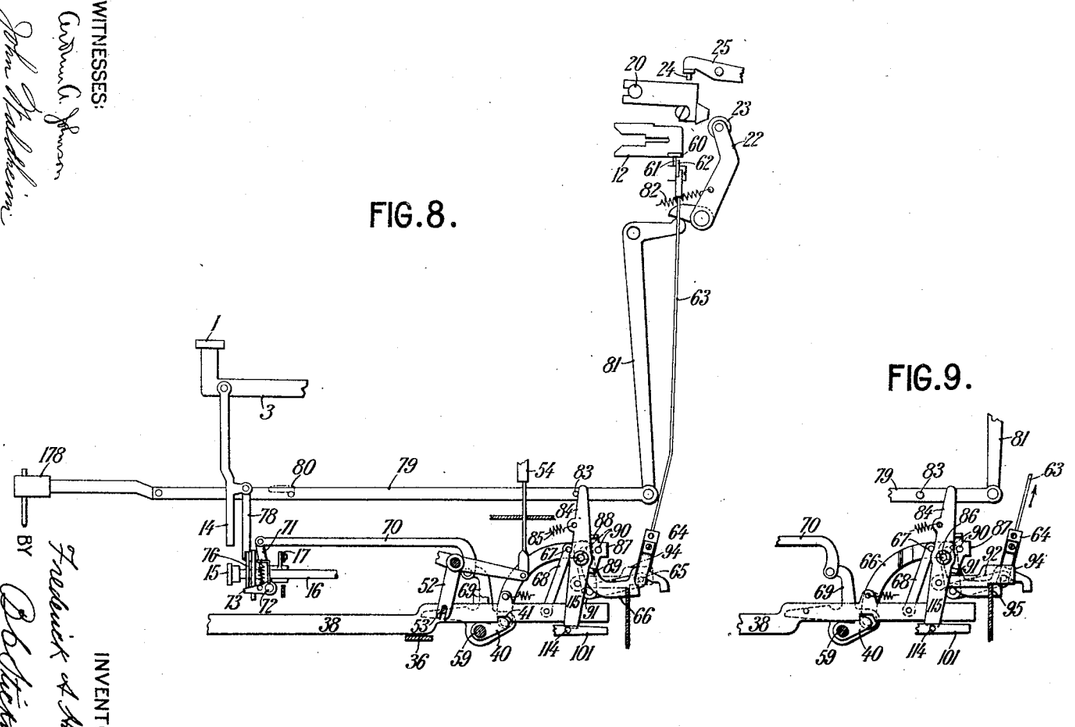
Fig. 8 is a skeleton view, taken from front to rear showing the non-add key as operated to not only silence the computing mechanism, but also silence the subtraction safeguard locking mechanism for the numeral keys.
Fig. 9 is a detail view, showing some of the parts of Fig. 8, and illustrates how the subtraction safeguard can be silenced without operating the non-add key.

Normally, the denominational selectors rest in a depressed position, Fig. 8, but when a computing zone is reached, a zone controller 22 forces, by means of its roller 23 engaging a conical roller, the denominational selector 19 of the zone at the printing point to the raised position of Fig. 1 where it will bring a tappet 24 thereon into engagement with a series of jacks 25. These jacks are pivoted intermediate their ends, and, when engaged *seriatim* by the selectors 19, are rocked to depress at their rear ends links 26, so as to operate transposition linkages 27 in the manner more particularly described in the above-mentioned applications.

The action is such, however, that the order of operation of the jacks 25, which is from right to left, will be reversed so that the linkages 27 will operate from left to right a series of denominational rack bars 28 which bear the nest of pins 18. Each of the bars 28 carries a row of the pins 18, nine in number, corresponding to the digits "1" to "9." Normally these pins 18 are out of register with the pin-setting linkages, but are brought into register therewith when the particular digit column to which they correspond is being written and computed in. The denominational selector 19, through the jacks and the associated transposition linkages, advances the denominational rack bars individually just far enough to bring the pins under the pin-setting linkage 17. This is more particularly described in the above-mentioned application of Ogden Minton, No. 797,714, filed October 28, 1913.

The denominational bars 28 have at their forward ends, racks 29 which drive gears 30 meshing therewith, which in turn, through pawl-and-ratchet mechanisms (not shown), drive dial wheels 32 of a computing head or register which is arranged to exhibit the sums run up thereon through a sight opening 33 in the computing casing 34. Sufficient play between the gears 30 and the dial wheels 32 is provided by the pawl-and-ratchets to allow for the movement of the pins 18 into and out of register with the pin-setting linkage 17.

When the digits of the number typewritten are set up in the nest of pins in this manner, they may be transferred or run into the dial wheels 32 by means of a general operator 35, which includes a cross bar 36 arranged to engage when driven forward the particular ones of the pins 18 which have been depressed below their fellows, so as to drive the denominational rack bars 28 amounts corresponding to the particular pins set. The rack bars are returned to their normal position in the manner described in the above-mentioned applications, and the pins 18 unset by a pin-restoring mechanism 37, so as to enable the setting up of a subsequent computation by means of the pin-setting linkage, which, together with the nest of pins, forms an indexing or valuating mechanism.

As explained in the above-mentioned applications, it is desirable to subtract as well as add. This is done by what is known as the complementary method, which consists in setting the pins 18 according to the complementary values of the keys actuated. This causes the dial wheels 32 each to be rotated on forward movement of the general operator an amount complementary to the numeral key actuated for each denomination, to which an extra unit may be added by the carrying mechanism on the return movement of the general operator. Means is also included for always imparting an extra unit's rotation to the units dial-wheel during a computation in subtraction. Only sufficient of this mechanism will be described to aid in showing the application of the present invention.

To set for subtraction there is provided a subtraction setting bar 38. This subtraction setting bar 38 is mounted to slide backwardly and forwardly, and is normally held in its forward position against the tension of a spring 39 by means of a latch 40, engaging in a notch 41 provided in the subtraction bar 38. The subtraction bar sets all of the "9" pins so that any of the computing wheels which do not have digits computed in their denominations may be rotated nine points which is the complement of "0".

The setting of the "9" pins is accomplished by a bail 42 overlying levers 43, one individual to each of the "9" pins, Fig. 2. The bail is normally held in its cleared position by a spring 44, but is rocked by means of a latch 45 on the subtraction bar 38 engaging an arm 46 connected to the bail 42. After the bail 42 has set the "9" pins, as in Fig. 2, the latch 45 during the final part of the rearward stroke of the subtraction-setting bar 38 is tripped against the tension of its spring 47 so as to release the arm 46, permitting the bail 42 to rise out of engagement with the "9" pins. This is done by a tail 48 on the latch 45 engaging a stop 49.

The subtraction bar 38, when operated by its spring 39, also shifts the rock shafts 16 so that they will become disconnected from the linkages 17 corresponding to the numeral keys associated with the rock shafts 16, and become connected with the linkages 17 corresponding to the complementary values of the numeral keys associated with the rock shafts 16. This is more particularly described in the above-mentioned applications. The shifting of the rock shafts 16 is accomplished by a bar 50 pivotally mounted to be rocked about its upper edge, and engaging notches 51 provided in the shafts 16 so as to be universal to all of them. The bar 50 is rocked by means of a bell crank 52, which in turn, is rocked by the subtraction bar 38 to which it has a pin-and-slot connection 53. Incidentally the bell crank 52 may operate, through a linkage 54, a ribbon-shift mechanism 55, so that type bars may print through the red portion of a bichrome ribbon 56 so as to indicate that the digits printed are subtracted.

The latch 40, which, when released, permits the operation of the subtraction bar 38 by its spring 39, may be withdrawn manually by a subtraction key 57, which is connected to swing an arm 58 secured to a shaft 59 to which the latch 40 is also secured.

To insure the release of the subtraction-setting bar when a subtraction zone is reached, provision is made for locking the numeral keys automatically so that the operative will be forced to set for subtraction before further computing action can take place. For this purpose, certain of the stops 12 located at subtraction zones may be provided with an extension 60 of the length corresponding to the magnitude of the zone. This extension 60 is arranged to engage a dog 61 when the subtraction zone is reached. The dog when depressed rocks a lever 62 to draw on a link 63 so as to raise the lower end thereof which includes a yoke 64. When in its normal position, the yoke 64 has a cross rod 65 underlying the rear end of a floating lever 66. The lever 66 is pivoted at 67 on a link 68 and pivot 67 at times acts as a fulcrum.

When the subtraction bar 38 is locked in its forward position and the subtraction extension 60 rocks the lever 62, then the floating lever is raised at its rear end so as to rock it about the pivot 67 as a fulcrum to depress its forward end, which in turn, rocks in a right-handed direction a bell crank 69. This bell crank 69 is connected to draw rearwardly a link 70, which in turn swings rearwardly against the action of a usual returning spring, shown diagrammatically, an arm 71 secured to a rock shaft 72. The rock shaft 72 has loosely mounted thereon an intruding dog 73 which is connected to swing with the rock shaft 72 by means of a spring 74. This forms a yielding connection, which in case the yielding dog is obstructed, will permit the rocking of the shaft 72 without a breaking of the parts.

Figure 7:
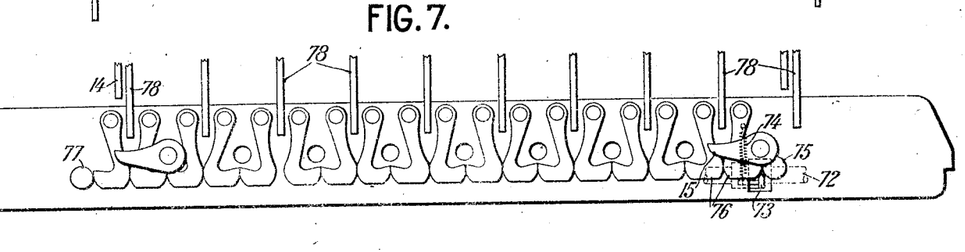
Fig. 7 is a detail front view of the locking mechanism for the numeral keys.

The intruding dog 73 is arranged to cam in between a stationary lug 75, Fig. 7, and the end one of a set of hanging locking hooks 76. These locking hooks are suspended between the fixed lug 75 and a second fixed lug 77 with just sufficient space in the set to permit the intrusion of a single one of a set of locking bars 78, one of which is hung on each of the dependent links 14 associated with each of the numeral keys 1. That is to say, the hooks 76 are arranged in pairs and if one of the numeral keys is actuated, the associated bar 78 will wedge itself between a pair of hooks taking up all of the space in the series of hooks, so that no other one of the bars 78 can be intruded between them. This also applies to the intruding dog 73. If it is raised to its intruding position by the subtraction extension 60 then none of the locking bars 78 can be depressed sufficiently to permit the full actuation of the numeral keys 1. In this way all of the numeral keys are locked when in a subtraction zone until the indexing mechanism is set for subtraction and stops 12 with extension 60 indicate subtraction zones.

Figure 3:
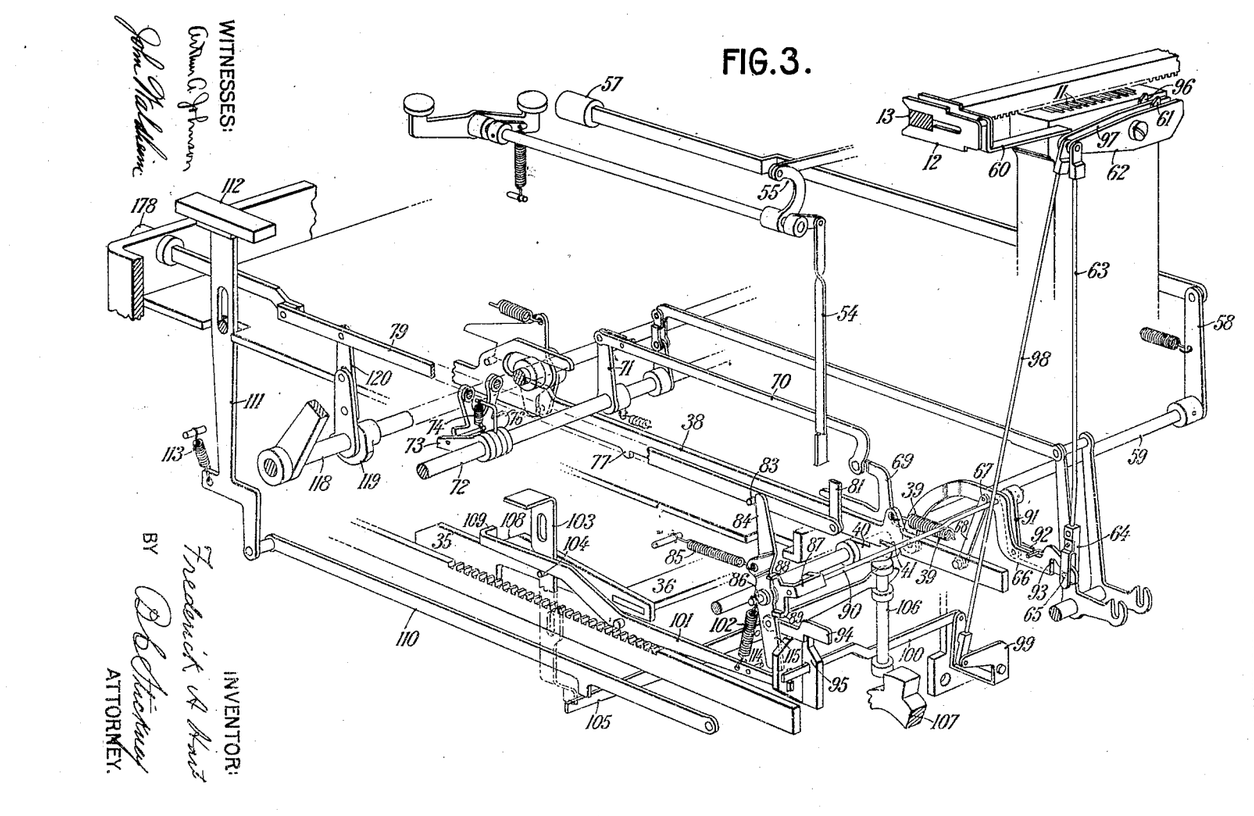
Fig. 3 is a skeleton perspective view, showing how the subtraction tappet controls actuation of the numeral key lock, so as to insure the setting for subtraction when in a subtraction zone.
Figure 4:
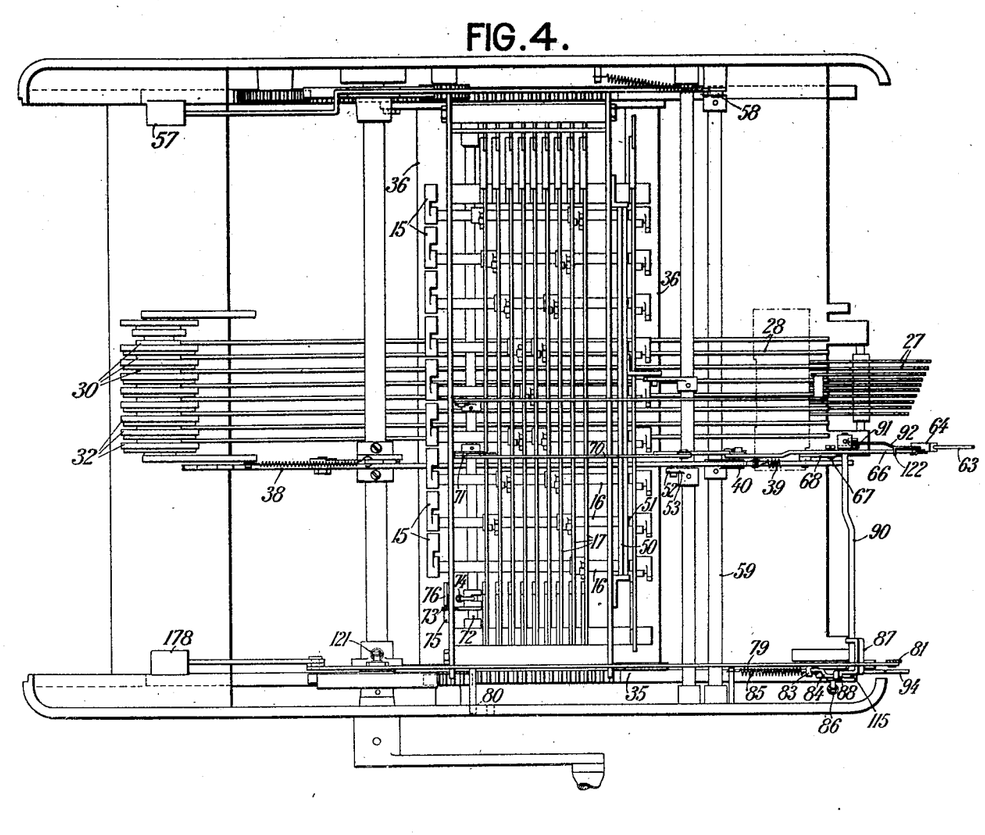
Fig. 4 is a plan view, looking down upon the pin-setting or indexing mechanism, and showing how the change from setting corresponding numbers to the setting of the complementary numbers is effected.
Figure 5:
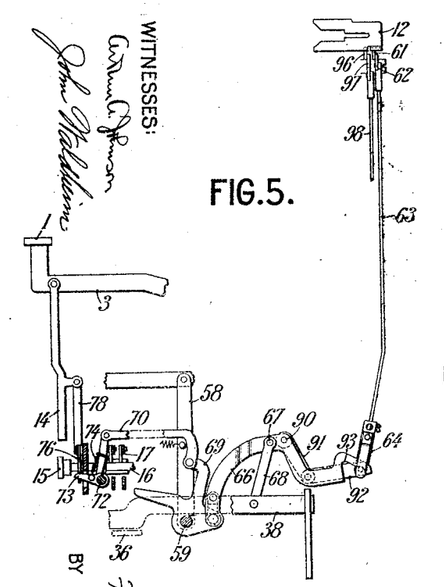
Fig. 5 is a detail contracted view, showing the connection of the subtraction tappet to the numeral key locking mechanism. In this view the subtraction tappet is shown as having locked the numeral keys against operation.
Figure 6:
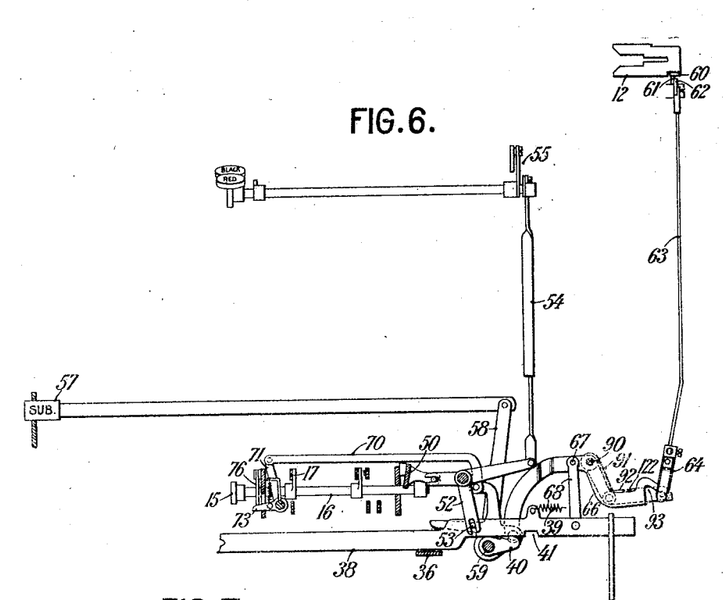
Fig. 6 is a view similar to Fig. 5, except that it is extended, and shows the key lock as having been unlocked by the operation of the subtraction-setting bar.

When the subtraction bar 38 is released it moves rearwardly, as before explained, and shifts the lower end of the link 68 so that the link assumes a more nearly vertical position. Since this link 68 is normally in the inclined position of Fig. 3, this will tend to straighten up the link 68, thereby allowing pivot 67 to rise and consequently the forward end of lever 66, under action of the returning spring referred to above, so as to withdraw the intruding dog 73 from its locking position between the end hook 76 and the lug 75.

When the carriage passes out of a subtraction zone, the extension 60 will clear the dog 61 so that the rear end of the floating lever 66 may be lowered, thus silencing the tendency of the locking dog 73 to intrude.

The subtraction bar 38 is restored to its normal position with a tensioning of the spring 39, by means of the cross bar 36 of the general operator engaging the lug 77 on the subtraction bar 38, when the general operator is actuated to run up the subtraction computation set up in the nest of pins. The safeguarding-locking mechanism is thus restored to normal, enabling its bringing into play in a future subtraction zone.

It is desirable at times to typewrite without computing. To do this, there is provided a non-add key 178, which when actuated, thrusts rearwardly a rod 79 locked by a pin and L-slot arrangement 80 in its actuated position. As usual, the L-slot, referred to, is in the outer casing and the pin projects therethrough in position to be manually controlled. The rod 79 rocks a bell crank 81, which, in turn, rocks the zone controller 22 against the tension of its spring 82, so as to withdraw the zone controller from beneath the path of the conical rollers on the denominational selectors 19, so that as they pass the region of the jacks 25, they will be maintained clear of said jacks, so that there will be no denominational selecting, and thus no setting up of the pins.

Advantage is taken of this non-add mechanism to silence or render ineffective the control of the numeral keys from the carriage, inasmuch as when there is no computing done it will not be desirable to warn the operative that a subtraction zone is reached. The rod 79 is provided with a pin 83, which, when the non-add key 178 is actuated, engages and rocks a lever 84 against the tension of a spring 85. The lever 84 is mounted on a pivotal axis 86 on which is also mounted an auxiliary lever 87, which is provided with a pair of projections 88 and 89 extending on opposite sides of the pivotal axis 86, so as to be engaged and operated by the lever 84 when rocked in either direction. The auxiliary lever 87 when rocked in this way rocks a crank shaft 90 on which is secured an arm 91. The crank shaft 90 is journaled in the floating lever 66 and is sufficiently flexible to allow for relative movement between its extreme ends. The arm 91 will thus be swung forward at its lower end so as to draw forward a link 92, which is connected to the yoke 64, so as to swing the same forwardly to bring the cross rod 65 out of engagement with the rear end of the floating lever 66 and into register with a notch 93, provided in the floating lever 66. This will permit an idle up-and-down movement of the yoke 64 and the cross rod 65, so that when the subtraction-controlling extension 60 passes the tappet 61 when entering a subtraction zone, there will be no locking of the numeral keys from this source. To prevent disengagement between lever 66 and cross rod 65, link 92 is provided with an extension 122 which overlies lever 66 and prevents said lever from being lifted sufficiently with respect to cross rod 65 so that its hooked end will be disengaged from said cross rod.

When the numeral key-locking mechanism is silenced by the depression of the non-add key 178, it may be restored either manually or automatically to a position in which it may be actuated when the typewriter carriage enters a subtraction zone. To restore it manually, the operative raises the pin of pin and slot connection 80, (Fig. 1) out of the notch at the rear end of its associated L-slot, thereby releasing the rod 79, which is thrust forwardly through the intermediary of the pin 83 thereon and lever 84 by the power of the springs 82 and 85. The lever 84 rocks the auxiliary lever 87, so that the lower end of the arm 91 connected thereto will be swung rearwardly, and therewith the link 92 and cross rod 65, so that the latter will underlie the rear end of the floating lever 66, in which position any extension 60 may actuate said lever to lock the numeral keys.

For automatically restoring the numeral key-locking mechanism to a position in which it may be actuated by an extension 60, there is provided mechanism to raise the pin 80 out of its notch at the rear of the L-slot, at the actuation of the general operator 35. This mechanism includes rack teeth formed on the general operator, (Figs. 1 and 3) in mesh with idle gears, which, in turn, are in mesh with gear segments, (Fig. 1), fast on a transverse shaft 118, with which machines of the Underwood-Hanson type are usually provided. Said gearing is so arranged that at the forward stroke of the general operator, the shaft 118 will be rotated in counter-clockwise direction, so that a cam 119 fast thereon will be swung to engage the lower end of a link 120 mounted to slide vertically against the tension of a spring 121. The upper end of the link is connected to the rod 79, to raise the forward end thereof during said forward stroke of the general operator, an extent sufficient to raise the pin 80 out of its notch in the L-slot, so that said rod may be thrust forwardly by the power of the springs 82 and 85, to restore the cross rod 65 to its normal effective position through the intermediary of its connections to the rod 79, in a manner as hereinbefore described. The silencing of the subtraction-zone control of the numeral key lock may be done without the operation of the non-add key, in case it is desired to silence the same and still both typewrite and compute. For this purpose there is provided a latch 94 pivotally connected to the lever 84 and arranged to be operated from the rear of the machine, so as to swing the latch 94 into locking engagement with a stationary locking lug 95. This will also, by operating the lever 84 through the connecting linkage withdraw the yoke 64 and the cross pin 65 to an ineffective position.

For releasing the numeral keys after they have been locked by reason of the typewriter carriage having been moved into a subtraction zone inadvertently, when it is desired to add (or not to compute) in said zone, the non-add key 178 may be depressed after said inadvertent locking of the numeral keys, to withdraw the cross bar 65 from its effective position into register with the notch 93, even though the floating lever 66 is in an actuated position. It will be seen that said withdrawal of the cross bar 65 will render the latter ineffective to hold the lever 66 in its actuated position, and will cause said lever to return to its normal ineffective position to unlock the numeral keys. If, however, it is desired to add after said inadvertent locking of the numeral keys, the latch 94 at the rear of the machine, may be swung into locking engagement with the lug 95 to withdraw the cross bar 65 in the same manner as at the depression of the non-add key as herein described.

The driving of the general operator 35 from the motor may be controlled automatically at the end of each computing zone from the typewriter carriage 7. For this purpose, each carriage stop or tappet 12 is arranged to engage at the end of the computing zone a dog 96 on a tripper 97. The tripper 97 is rocked to draw on a link 98, which rocks a bail 99 to withdraw a latch 100 from above a lever 101. This enables the spring 102 to rock the lever 101, so that it depresses a thrust link 103 by engagement with a pin 104 carried thereby. The thrust link 103 overlies a lever 105 to rock the same, so as to withdraw a stop pin 106 lying in the path of one of the clutching elements 107 of the usual Underwood-Hanson clutch connection to the motor shown and described more particularly in the application of John N. Thornton No. 769,132 filed May 22, 1913, (now Patent No. 1,283,360, dated October 29, 1918). As the general operator moves forward, a cam surface 108 thereon engages a bend 109 in the lever 101, so as to rock this lever tensioning the spring 102, and permitting the latch 100 to once more hold it in its set position. Inasmuch as the carriage will have carried in the meanwhile the actuating stop 12 clear of the dog 96, the lever 105 may be operated manually if desired by a superposed lever 110, which in turn, is operated by a thrust rod 111, bearing at its upper end a finger-piece 112, whereby it itself may be operated against the tension of a spring 113.

Incidentally this automatic tripping of the motor into action may be prevented from coming into use when the computing mechanism is silenced by the non-add key 178, and also when the automatic setting for subtraction is silenced by the latch 94. For this purpose, a stop pin 114 on the lever 101 is engaged and obstructed by the lower end 115 of the lever 84 when it is rocked in a right-handed direction either by the non-add key 178 or by the latch 94.

It will thus be seen that in this combined typewriting and computing machine, when a subtraction zone is reached, the numeral keys will be locked against actuation until the operative sets the indexing or valuating mechanism for a subtracting action. It also has been shown that the locking of the numeral keys in this automatic manner can be silenced when the computing mechanism is silenced by the non-add key. Further, the locking of the numeral keys for a subtraction zone can be silenced independently, so that computing and typewriting can go on without locking of the keys when a subtraction zone is reached.

Variations may be resorted to within the scope of the invention, and portions of the improvements may be used without others.

Having thus described my invention, I claim:

1. The combination with computing mechanism, of substraction-setting mechanism for said computing mechanism, means including numeral keys, for operating said computing mechanism, means including a traveling carriage to determine different computing zones, including addition and subtraction zones, locking means for preventing more than one numeral key from being operated at the same time, and subtraction indicating mechanism cooperating with said locking means for preventing any of said numeral keys from being operated when said carriage arrives in a subtraction zone.

2. The combination with computing mechanism, of subtraction setting mechanism for said computing mechanism, means, including numeral keys, for operating said computing mechanism, means, including a traveling carriage, to determine different computing zones, including addition and subtraction zones, locking means for preventing more than one numeral key from being operated at the same time, mechanism coöperating with said locking mechanism for preventing any of said numeral keys from being operated when said carriage arrives in a subtraction zone, and releasing means operated from said subtraction-setting mechanism for rendering ineffective said locking means to permit an operation of the numeral keys in a subtraction zone when the computing mechanism has been set for subtraction.

3. The combination with computing mechanism, of means, including a traveling carriage, to determine computing zones, including addition and subtraction zones, numeral keys, dogs connected therewith, numeral-key-actuated devices controlling both said carriage and said computing mechanism, a crowding lock for preventing the operation of more than one numeral key at a time, said crowding lock comprising a series of movable members so positioned that depression of a numeral key will cause intrusion of the corresponding dog between said movable members, and means to limit the movement of said movable members so that intrusion of one of said dogs will crowd said movable members together and thereby prevent the simultaneous insertion of another of said dogs, a subtraction tappet on said carriage indicating a subtraction zone, an additional intruding dog, and connections between said subtraction tapped and said additional intruding dog whereby the latter may be operated, so as to wedge into said crowding lock, to prevent the operation of any of said numeral keys when a subtraction zone is reached.

4. The combination with computing mechanism, of means, including a traveling carriage, to determine computing zones, including addition and subtraction zones, numeral keys, numeral-key-actuated devices for controlling both said carriage and said computing mechanism, dogs severally controlled by said numeral keys, a crowding lock for preventing the operation of more than one numeral key at a time, said crowding lock being positioned to coöperate with said dogs and comprising a plurality of movable members, and confining means therefor such that intrusion of one of said dogs by depression of the corresponding numeral key will crowd said movable members together so as to prevent the intrusion of any other of said dogs, a subtraction tappet on said carriage indicating a subtraction zone, an additional intruding dog and connections between said subtraction tappet and said additional intruding dog whereby the latter may be operated, so as to wedge into said crowding lock, to prevent the operation of any of said numeral keys when a subtraction zone is reached, and subtraction-setting means effective, when operated, to withdraw said intruding dog, so as to release said numeral keys for operation.

5. The combination with computing mechanism, of means, including numeral keys for operating said computing mechanism, means for indicating that a subtracting operation of said computing mechanism should take place, and key-actuated disconnecting means for preventing the operation of said last-mentioned means.

6. The combination with computing mechanism, of means for indicating when said computing mechanism should effect a subtracting operation, subtraction-setting mechanism, means controlled by said subtraction-setting mechanism for rendering ineffective said indicating means, and key actuated means for rendering said indicating means ineffective.

7. The combination with computing mechanism, of means, including numeral keys, for actuating said computing mechanism, means, including a carriage for controlling computing zones, including addition and subtraction zones, and carriage-controlled means for locking said numeral keys when a subtraction zone is reached; and key actuated disconnecting means for preventing the locking of said numeral keys when a subtraction zone is reached.

8. The combination with typewriting mechanism, including numeral keys and means, including a traveling carriage, to determine addition and subtraction zones, of computing mechanism controlled by said typewriting mechanism to enable combined typewriting and computing actions, means for insuring a subtracting action at the proper time in a subtraction zone, and means for rendering said computing mechanism ineffective, connected to also render ineffective said insuring means, so that said typewriting mechanism may be operated independently of the computing mechanism.

9. The combination with typewriting mechanism, comprising means including a traveling carriage to determine addition and subtraction zones and numeral keys, of computing mechanism controlled by said numeral keys, locking means for preventing the operation of said numeral keys, controlled from said carriage, so as to prevent a typewriting and computing action when a subtraction zone is reached, and means for rendering said computing mechanism ineffective connected to disconnect said locking means from said carriage, so as to enable the independent action of said typewriting mechanism.

10. The combination with computing mechanism, of typewriting mechanism coöperating with said computing mechanism, including numeral keys and means including a traveling carriage to determine computing zones, both addition and subtraction, locking means for said numeral keys, means for operating said locking means when a subtraction zone is reached, subtraction-setting mechanism for silencing said locking means, computing mechanism-disconnecting means effective to prevent the bringing into play of said locking means by said operating means, and an independent manual control for preventing the bringing into play of said locking means by said operating means.

11. The combination with computing mechanism, of means including numeral keys, for operating said computing mechanism, means, including a traveling carriage, to determine addition and subtraction zones, a subtraction tappet carried by said carriage, locking mechanism for said numeral keys, an extension on said subtraction tappet, means actuated by said extension to actuate and maintain said locking mechanism in action for the full width of a subtraction zone, and means for rendering ineffective the locking mechanism by rendering said extension-actuated means ineffective while the carriage is still in a subtraction zone.

12. In a combined typewriting and computing machine, numeral keys, a traveling carriage, a computing mechanism adapted to compute additively or subtractively in any position of the carriage, locking means for preventing more than one numeral key from being operated at the same time, mechanism coöperating with said locking means for preventing any of said numeral keys from being operated when said carriage arrives in a position where it is desired to subtract, subtraction-setting mechanism, and releasing means operated by said subtraction-setting mechanism for throwing out said locking means to permit an operation of the numeral keys in such position of the carriage when the computing mechanism has been set for subtraction.

13. The combination with computing mechanism, of means, including numeral keys, for operating said computing mechanism, locking mechanism for said numeral keys, operating connections through which said locking mechanism is controlled, means acting through said operating connections to throw said locking mechanism into action, and means for controlling said operating connections to render said locking mechanism ineffective while said first-mentioned means is still in action.

14. The combination with computing mechanism, of means, including numeral keys, for operating said computing mechanism, locking mechanism for said numeral keys, operating connections for making said locking mechanism effective, so as to prevent the operation of said numeral keys, said operating connections including a floating lever, actuating means for operating on said lever at one end about a pivot intermediate its ends, and means for permitting movement of said pivot so as to render the locking mechanism ineffective.

15. The combination with computing mechanism, of means including numeral keys, for operating said computing mechanism, denominational selecting mechanism for said computing mechanism, a zone-controller for said denominational selecting mechanism, means including a non-add key, for throwing said computing mechanism out of action by rendering ineffective said zone-controller, locking means for said numeral keys, means for operating said locking means to prevent an actuation of said numeral keys, said operating means having an adjustable connection to enable either a positive action or an idle movement, and connections for controlling said adjustable connection from said non-add key.

16. In a combined typewriting and computing machine, numeral keys, a traveling carriage, a computing mechanism adapted to compute additively or subtractively in any desired position of the carriage, locking means controlled from said carriage for preventing operation of said numeral keys when said carriage is in a position where it is desired to subtract, and means for rendering said computing mechanism inoperative, said means also making said carriage inoperative on said locking means.

17. The combination with computing mechanism, of means, including numeral keys, for operating said computing mechanism, locking mechanism for said numeral keys, a floating lever, connections controlled by said floating lever to bring said locking mechanism into play, a subtraction tappet, connections actuated by said tappet to operate said lever, and means, including a subtraction-setting bar, to permit the operation of said floating lever in the opposite sense to said subtraction tappet, so as to render said locking mechanism ineffective.

18. The combination with computing mechanism for performing different kinds of computations, of numeral keys for controlling said computing mechanism, dogs severally connected to said numeral keys to be controlled thereby, a locking device for said numeral keys, said locking device being rendered effective by the intrusion of one of said dogs, due to the depression of the corresponding numeral key, to prevent the depression of any other numeral key, means for determining zones for different kinds of computations, and means for preventing a certain kind of computation in certain zones, including an intruding dog to coöperate with said locking device and render it operative to prevent depression of any of said numeral keys.

19. In combination, computing mechanism, including numeral keys, for operating said computing mechanism, means including a traveling carriage to determine zones in which different kinds of computations are to be effected, means for preventing simultaneous depression of two numeral keys, and means rendered effective by said zone-determining means for coöperating with said simultaneous depression-preventing means to prevent depression of any of said numeral keys when a zone corresponding to a certain kind of computation has been reached.

20. The combination with computing mechanism and numeral keys for controlling the same, of means for determining computing zones, means for changing the state of said computing mechanism, means for indicating that a change of state should be made for certain computing zones, said indicating means comprising mechanism for locking said numeral keys at the beginning of such a computing zone and for retaining such locked condition throughout the zone subject to a proper change of state, connections between said state-changing means and said indicating means whereby proper change of the former will render the latter ineffective and thereby unlock said numeral keys, and means to return said state-changing means to its original condition and thereby restore said indicating means to effective condition.

21. The combination with computing mechanism and means including numeral keys and a general operator for operating said computing mechanism, of means for determining computing zones, mechanism for changing the state of said computing mechanism, means for locking said numeral keys in certain computing zones and thereby indicating that a change of state is required, connections between said state-changing mechanism and said locking means whereby actuation of the former will render the latter ineffective, and general-operator-actuated-means for resetting said state changing mechanism and thereby restoring said locking means to normal condition.

22. The combination with computing mechanism and operating means therefor, including numeral keys and a general operator, of means for determining computing zones, subtraction-setting means, means to indicate the computing zones in which subtraction is to be performed, said indicating means including mechanism for locking said numeral keys in subtraction zones, connections between said subtraction-setting means and said subtraction-indicating means whereby actuation of the former will render the latter ineffective, and general-operator-actuated-means to return said subtraction-setting means and thereby said computing mechanism to normal condition.

23. The combination with computing mechanism normally set for addition, of means including numeral keys for actuating said computing mechanism, locking means for said keys including a member movable to effective and ineffective positions, and yielding means normally urging said member to ineffective position, means for determining subtraction zones, connections between said subtraction-zone-determining means and said movable member, whereby the latter will be moved to effective position against action of said urging means, subtraction-setting mechanism, and means whereby said subtraction-setting mechanism may render ineffective the connections between said subtraction-zone-determining means and said movable member, thereby permitting the latter to return to ineffective position under the action of said urging means.

24. The combination with computing mechanism normally set for addition, of means including numeral keys for actuating said computing mechanism, numeral key locking means including a controlling member movable to effective and ineffective positions, and means yieldingly urging said controlling member to ineffective position, subtraction-zone-determining means, connections including a lever having a movable fulcrum, whereby said subtraction-zone-determining means may move said movable member to effective position, subtraction-setting means, and means controlled by said subtraction-setting means for determining the position of said movable fulcrum, and thereby determining the effectiveness of said subtraction-zone-determining means on said movable member.

FREDERICK A. HART.

Witnesses:
 EDITH B. LIBBEY,
 CATHERINE A. NEWELL.